United States Patent [19]

Lang

[11] 4,428,449
[45] Jan. 31, 1984

[54] COMPARATOR FOR THE CONTROL CIRCUIT OF AN AUTOMATIC STEERING INSTALLATION

[75] Inventor: Armin Lang, Schwabisch Gmund, Fed. Rep. of Germany

[73] Assignee: Zahnradfabrik Friedrichshafen, AG., Friedrichshafen, Fed. Rep. of Germany

[21] Appl. No.: 247,298
[22] PCT Filed: May 16, 1980
[86] PCT No.: PCT/DE80/00057
§ 371 Date: Mar. 27, 1981
§ 102(e) Date: Mar. 27, 1981
[87] PCT Pub. No.: WO80/02540
PCT Pub. Date: Nov. 27, 1980

[30] Foreign Application Priority Data

May 16, 1979 [DE] Fed. Rep. of Germany ....... 2919712

[51] Int. Cl.³ .............................................. B62D 5/06
[52] U.S. Cl. ...................................... 180/131; 91/385; 56/DIG. 15; 104/244.1; 180/79
[58] Field of Search .......................... 180/131, 132, 79; 280/776; 56/DIG. 15; 104/244.1; 91/359, 364, 369, 385, 386

[56] References Cited

U.S. PATENT DOCUMENTS 3,693,504  9/1972  Gilbert ................................. 91/385
3,708,029  1/1973  Sedgfield et al. ..................... 180/79
4,219,093  8/1980  Lang .................................. 180/131
4,304,316  12/1981 Lang .................................. 180/131
4,367,802  1/1983  Stiff .................................. 180/131

Primary Examiner—David M. Mitchell
Assistant Examiner—Donn McGiehan
Attorney, Agent, or Firm—Zalkind & Shuster

[57] ABSTRACT

A simplified construction of a comparator is provided in an automatic steering system utilizing dual chambers separated by a membrane, e.g., a diaphragm or bellows. Each side of the membrane operates a respective valve which valves are normally open but can control flow to a hydraulic cylinder for steering or centering the wheel of an agricultural vehicle. Fluid flows through the chambers which connect to exhaust through variable throttle valves. Sensors, i.e., feelers, follow rows of plants and when the feelers are deflected they operate respective throttle valves which cause a buildup of pressure in a respective chamber. Such differential pressure between the chambers flexes the membrane in a direction to operate the valves within the chambers. Operation of such valves effects directional pressurizing of a hydraulic motor to steer the vehicle wheel. A direct mechanical linkage between the vehicle wheel and the membrane introduces an opposing force on the membrane due to the steered direction of the wheel, to subsequently center the wheel. Such mechanism can, independently of the feelers, center a deflected wheel when there is no deflection of the feelers.

10 Claims, 4 Drawing Figures

COMPARATOR FOR THE CONTROL CIRCUIT OF AN AUTOMATIC STEERING INSTALLATION

The present application is a simplification of the application of Armin Lang filed Aug. 25, 1978, Ser. No. 936,945, now U.S. Pat. No. 4,304,316 cross reference being made thereto.

STATUS OF THE PRIOR ART

The invention relates to a comparator which is distinguished from the application cross referenced above in the economical use of pumping means which feed the feelers that scan a row or rows of plants for vehicle guidance. Thus, in the previous application certain output signals either in the form of a change in pressure or volume acted upon a tiltable plate or lever which controls valves responsive to movement of the feelers wherein the system required a certain minimum operating power at all times with some reduction in sensitivity as a result. Further, in the previously filed application, the hydraulic lines had to be carefully ventilated, whereas the present construction minimizes any such need.

BRIEF DESCRIPTION OF THE INVENTION

The invention utilizes a comparator which does not require special pumps but effects pressures on each side of a flexible membrane such as a diaphragm or bellows in accordance with flow therepast responsive to the throttling of flow on respective sides of the diaphragm. Such differential throttling of flow and thus a difference in pressure built up on the sides of the diaphragm actuates it to operate valves which control flow to a hydraulic motor for centering vehicle wheels after deflection. Also, by a mechanical connection, the wheels can be brought to neutral or straight ahead position from a deflected position. Such connection acts directly on the membrane to flex it for operating the valves even though the feelers have not contacted plants.

The arrangement operates with considerable sensitivity, since only small movement of the feelers to actuate respective throttles is required. There is a constant flow through a respective chamber on each side of the membrane exhausting through a respective variable throttle operable by the feelers. Accordingly, strict ventilation of the hydraulic lines to the variable throttles is not required, air bubbles being automatically removed by the constant flow. By the use of variable throttles which are simple and inexpensive components instead of special pump generators as in the prior application, a considerable simplification and economy is effected.

A detailed description of the invention now follows in conjunction with the appended drawing, in which.

Figure 1:
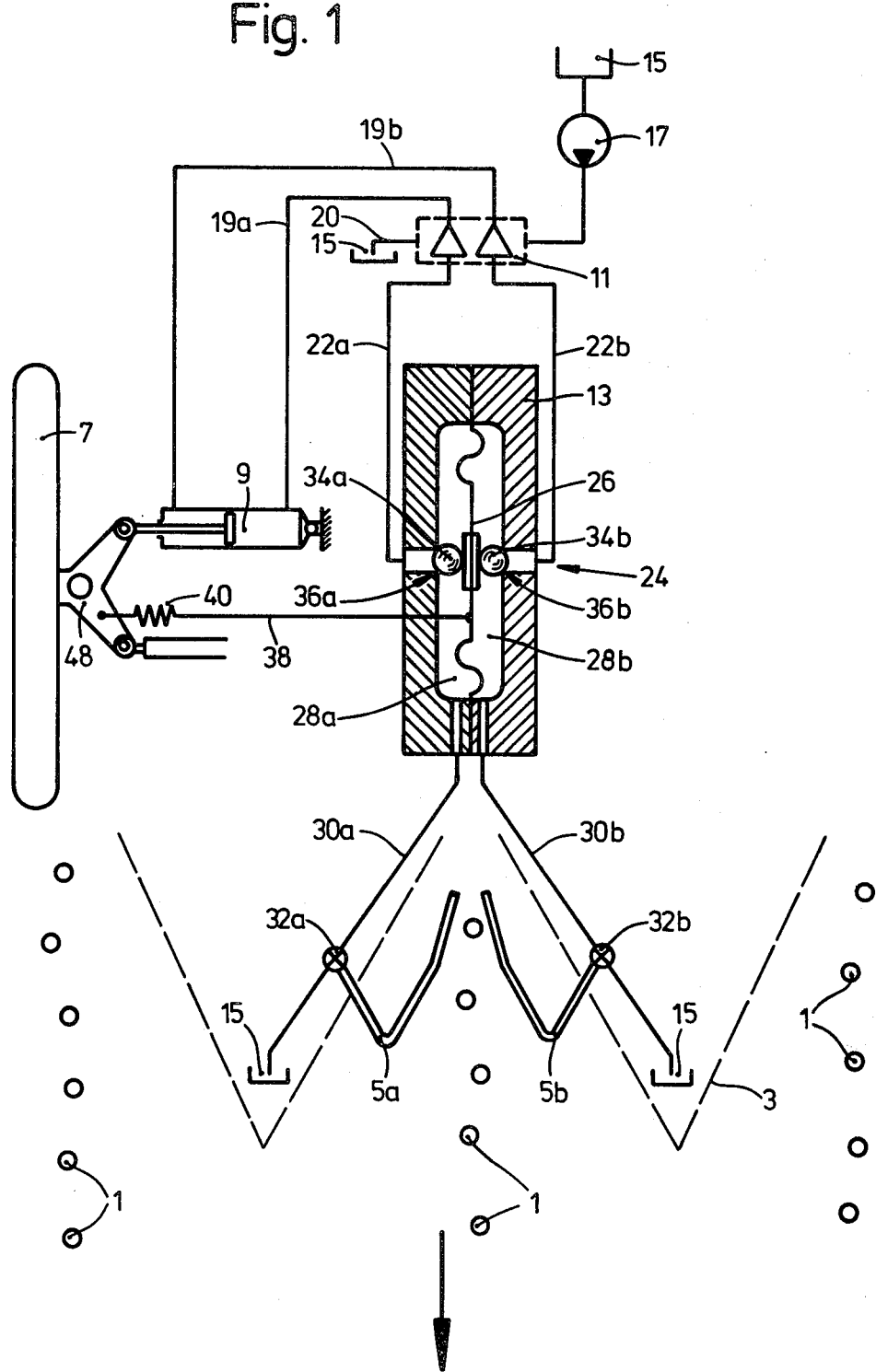
FIG. 1 is a symbolic layout of an overall system showing a basic form of comparator.

Referring now to FIG. 1, the guide means 1 illustrated either as a row of plants or as a parallel row of plants with certain irregularities as shown, will be understood to be scanned by feelers and represent, for example, rows of growing corn. The broken lines 3 represent guide components of an agricultural vehicle such as a harvester. The vehicle has two feelers, 5a and 5b, which jointly scan the center row for purposes of illustration in this instance. A vehicle wheel 7 is shown which can be steered by a hydraulic motor 9 operative through a control valve 11, such a valve being shown in FIG. 5 of U.S. Pat. No. 4,219,093. The housing 13 illustrates a basic comparator for purposes of illustration.

Control valve 11 is pressure fed by fluid drawn from a tank 15 and passing through a high pressure pump 17, being connected to the opposite pressure chambers of the hydraulic motor 9 via respective lines or conduits 19a and 19b and valve 11 is connected by conduit 20 with tank 15. Fluid flow is in the order of magnitude of 0.5 l/m through the control valve 11 and thence through feed lines 22a and 22b to the comparator 24.

It can be noted at this time that basically the comparator is extremely simple and only a diaphragm 26 is utilized in place of rocking plates or levers, as in the cross referenced application. Such diaphragm divides the housing 13 into dual pressure chambers 28a and 28b. Each side of the diaphragm is engageable with a respective valve in the form of a ball, such as valve balls 34a and 34b, which coact with respective valve seats 36a and 36b in the two halves of the housing. Thus, the ball valves and ball seats constitute separate valves with the ports of the valve seats connecting respectively to the conduits 22a and 22b, and it may be noted at this time that the valves are normally open in straight ahead direction of a vehicle wheel or wheels.

Thus, conduit 22a connects through pressure chamber 28a, which has an outlet via conduit 30a to tank 15. Within the conduit 30a is a variable throttle 32a operable by movement of feeler 5a. Thus, flow from control valve 11 through pressure chamber 28a would effect an increase in pressure in that chamber upon deflection of feeler 5a by the throttling of exhaust flow from the chamber. The same is, of course, true for the other pressure chamber 28b, conduit 30b, variable throttle 32b and feeler 5b, which controls the throttling effect to increase pressure in chamber 28b.

Diaphragm 26 is also subject to operation by means of a mechanical connection 38, a simple pull rod in this case, acting through a spring 40 connected to the steering lever 48.

In the operation of the above described system when there is a neutral or straight ahead position of the steering wheel or wheels, depending upon the type of agricultural implement, fluid flows from control valve 11 through the conduit 22a and 22b and the open valve seats 36a and 36b into the pressure chambers 28a and 28b, it being understood that the valve balls 34a and 34b are sufficiently open to permit such flow. Flow continues from the pressure chambers through the conduits 30a and 30b and the variable throttles 32a and 32b for return to tank 15. In such neutral position, the variable throttles are open to equal position for the equal flow therethrough and the same pressures prevail in the conduits 22a and 22b and in chambers 28a and 28b. At that time, there is no force acting through spring 40 nor on diaphragm 26. The equal pressures in lines 22a and 22b prevail through the control valve 11 and thence to the respective conduits 19a and 19b to the respective pressure chambers of hydraulic motor 9. Accordingly, there is no movement of the piston therein.

However, assuming that the wheel 7 is deflected to, say, the right, spring 40 is tensioned even though the feelers 5a and 5b may remain in neutral position and provide no differential pressure on respective sides of diaphragm 26. Such deflection of the wheel could occur by an obstruction or irregularity of the terrain in the wheel path. However, due to the pulling effect of spring 40 acting through connection means 38, the diaphragm 26 is pulled in a direction so that ball valve 34a seats against valve seat 36a. Thus, a pressure is built up in the conduit 22a due to the cut-off of flow through chamber 28a. Such pressure acting through control valve 11 to conduit 19a actuates hydraulic motor 9 to cause an opposite deflection of wheel 7, thus centering the wheel and effecting a stabilization thereof. It will be understood that in the event of a deflection of wheel 7 to the left, spring 40 deflects diaphragm 26 to seat ball valve 34b, when pressure in line 22b acting through control valve 11 builds up pressure in line 19b causing an opposite deflection of wheel 7.

However, if during straight ahead movement of the vehicle with wheel 7 in neutral position, feeler 5a is deflected to the left and actuation of the variable throttle 32a narrows the flow area therethrough. This builds up pressure in chamber 28a causing diaphragm 26 to deflect to the right. Accordingly, ball valve 34b seats against seat 36b to close off flow through chamber 28b effecting a buildup in pressure in conduit 22b which pressure build up acting through control valve 11 pressurizes hydraulic motor 9 in the direction of a right turn of wheel 7. Such steering stretches spring 40 to establish the stabilizing reaction by the force exerted on the diaphragm for centering the wheel.

Figure 2:
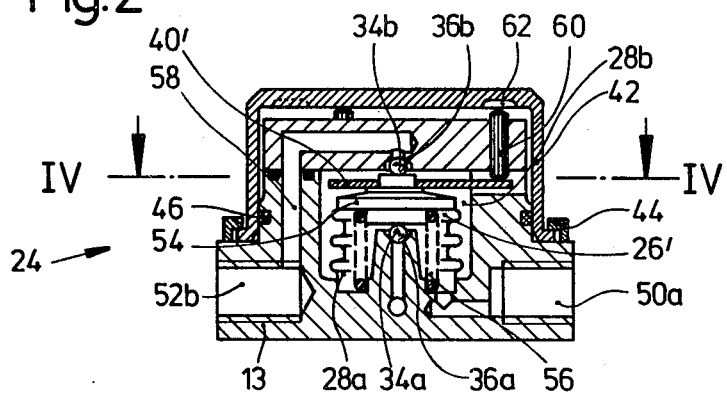
FIG. 2 is a longitudinal elevation through a comparator in accordance with the construction of the invention.
Figure 3:
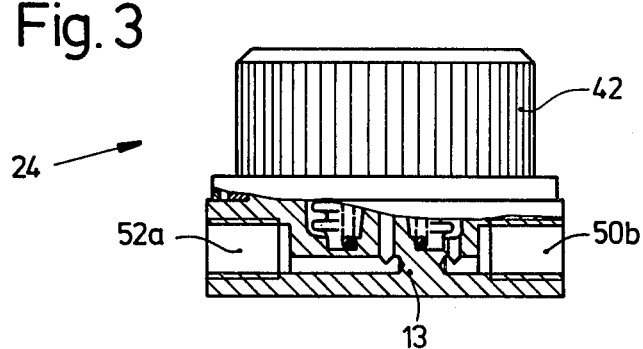
FIG. 3 is a partial section in elevation taken in a plane at right angles to the section of FIG. 2.
Figure 4:
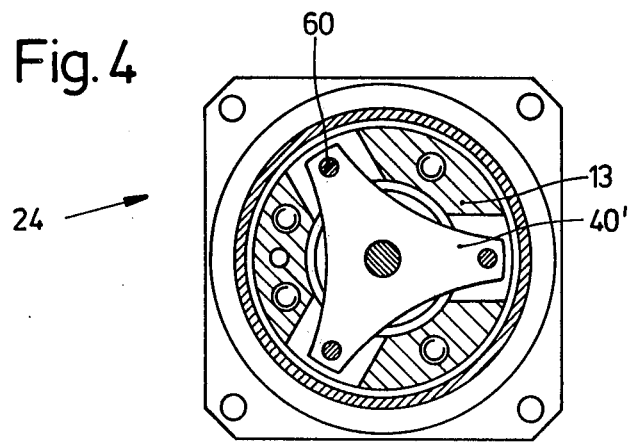
FIG. 4 is a radial section through IV—IV of FIG. 2.

Referring now to FIGS. 2-4, a preferred embodiment of the invention is disclosed for the comparator, per se. Other parts of the system as shown in FIG. 1 have been heretofore known. The variable throttles 32a and 32b may be of a rotary type or nozzle-needle type or nozzle-rebound plate type.

Comparator 24 has a housing 13 with a rotative cap 42 secured by a fastening ring 44 which will be understood to hold the cap to the housing but permit rotation, and wherein gasket 46 is utilized intermediate the housing and the inside wall of the cap. Housing 13 may be fixed to a vehicle frame while the rotative cap 42 may be attached to a pivotal part of steering mechanism, for example, the steering lever 48 of FIG. 1.

Within the housing there is disposed a bellows 26' separating the housing into pressure chambers 28a and 28b, respectively, and an inner pressure chamber and an outer pressure chamber. Chamber 28a communicates with a port 50a of the housing, while pressure chamber 28b communicates with port 50b (FIG. 3). There are altogether four ports, the additional ports 52a and 52b communicating with the valve seats 36a and 36b, respectively. Such communication is through an angular channel 58 for port 52b and valve seat 36b. Port 52a (FIG. 3) connects to valve seat 36a, closeable by valve ball 34a. In this instance, the bellows 26' is operated by a pressure cap 54 connected securely to the bellows so that movement of the cap will expand or compress the bellows, as will be understood.

Within the bellows and acting against the inner face of the pressure cap 54 is the compression spring 56 supported at its opposite end against a housing wall as shown. A further spring 40' in the form of a triangular resilient leaf spring is disposed above pressure cap 54 (FIG. 4), and carried thereon. The three arms of the spring 40' are acted on by respective pins 60 slidably carried in bores in the plate which closes the housing, as shown. The pins 60 are cam followers actuated by cam surfaces 62 within the inner surface of the rotary cap 42.

All such cam surfaces are identical and it will be understood that rotation of cap 42 effects axial movement of the pin 60 to bear upon the resilient leaf spring 40' with equal simultaneous forces and against the predetermined compression in the spring 56, which is designed to have the least possible spring rate.

OPERATION

Bearing in mind the overall functioning of the system as heretofore described, the construction as seen in FIGS. 2-4 illustrates a neutral position of straight ahead steering of the wheel 7.

Thus, the rotative cap 42, the compression spring 56 and the actuating spring 40' are in balance so that the valve balls 34a and 34b are equally distant from the respective valve seats 36a and 36b. This is a condition of equilibrium. If, however, rotation of cap 42 occurs by deflection of the wheel in a particular direction, the cam follower pins are moved upwardly by virtue of the initial compression in the spring 56, which eases the flexure stress on the spring 40'. Accordingly, the valve ball 34b is seated by the then preponderant force of spring 56. On the other hand, for a reverse direction of wheel deflection, with rotation of cap 42 in the opposite direction, flexure stress in spring 40' is increased, thereby closing valve ball 34a against its seat, since spring 40' then overcomes spring 56. Thus, deflection of the wheel effects a centering force by the closing of either of the valves depending on direction of deflection in the manner described for the overall system. This presupposes that neither of the feelers 5a or 5b have been affected by the row of plants.

On the other hand, where the feelers are operated by plants, the actuation of respective throttle valves 32a and 32b causes the system to operate by virtue of the differential pressure existing in the chambers 28a and 28b on opposite sides of the bellows 26'.

In that case, the pressure difference between the conduits 22a and 22b operate control valve 11 for directionally pressurizing hydraulic cylinder 9 to effect steering.

By the use of three identical cam surfaces 62 any arbitrary and predetermined response between the angle through which cap 42 is rotated and the differential control pressures may be predetermined. This permits design of the embodiment to a desired angle of wheel deflection, for a small or large angle.

Operation of spring 40' is accompanied with a certain amount of friction due to the rotation of cap 42 on the housing 13, and also due to the usual cam friction between the cam surfaces and the cam followers and the movement of the followers. Such frictional forces, however, are of no particular significance since they occur in the transmission of force before spring 40' commences significant operation. These frictional forces are produced by the hydraulic cylinder 9 acting through the steering lever 48 and are therefore of no consequence. On the contrary, the bellows 26' and the initially stressed compression spring 56 can be considered as operationally free of friction. Accordingly, the regulating function of the comparator operates practically free of hysteresis effect.

What is claimed is:

1. A comparator for an automatic steering system wherein said system comprises feelers for scanning guide lines such as rows of plants and said comparator comprises pressure chamber means having a member movable by a difference in pressure in said chamber means to operate valve means for actuation of motor means for steering a vehicle wheel;

said difference in pressure being responsive to operation of said feelers by guide lines and said comparator including mechanical actuating means whereby movement of said member is also responsive to change in wheel direction operating said valve means for wheel centering;

the improvement which comprises:

said chamber means comprising a pair of chambers (28a, 28b) said movable member (26, 26′) being operatively related to the chambers for exposure to the pressures therein and being responsive thereto for movement including a respective means (50a, 50b, 52a, 52b) for feeding pressure fluid through said chambers comprising respective inlets (52a, 52b) and outlets 50a, 50b);

said valve means comprising valves (34a, 36a, 34b, 36b) disposed to normally pass said flow through a respective pressure chamber;

pressure control means for said pressure chambers wherein each chamber outlet has a variable throttle valve (32a, 32b) connected for flow from a respective chamber and operable by a respective feeler (5a; 5b) to throttle flow for increasing pressure in a respective chamber creating a pressure difference between chambers and thereby effecting movement of said movable member to operate said valves for actuation of said motor means effecting vehicle wheel steering; said mechanical actuating means being resiliently coupled to said movable member whereby a change in direction of a vehicle wheel mechanically moves said movable member to operate said valves producing centering of said wheel by said motor means without operation of said feelers.

2. A comparator as set forth in claim 1, wherein said mechanical actuating means comprises a resilient means (40′) through which actuation of said movable member occurs.

3. A comparator as set forth in claim 1, including a housing (13) with said pressure chambers therein;

said movable member comprising flexible wall separating said pressure chambers;

said mechanical actuating means comprising spring means (56) effecting an initial bias in one direction of movement of said flexible wall;

and further comprising a resilient member (40′) in said housing disposed to act against said initial bias under initial stress for a neutral wheel position;

and a mechanical operating means (60, 62) for varying the bias of said spring means through said resilient member responsive to deflection of a vehicle wheel from a neutral position whereby to operate said valves by said flexible wall for centering said vehicle wheel.

4. A comparator as set forth in claim 3, said mechanical operating means comprising at least one cam follower (60) engaging said resilient member (40′);

a rotative cap (42) carried by said housing adapted to be rotated relative to said housing by deflection of a vehicle wheel and having a cam surface (62) operative on said cam follower for varying the stress on said resilient member.

5. A comparator as set forth in claim 3, said resilient member comprising a leaf spring (40′) having a plurality of extending flexible arms;

a rotative cap (42) carried by said housing adapted to be rotated in response to deflection of a vehicle wheel and having cam surfaces (62) corresponding in number to the number of arms;

respective reciprocal cam follower pins (60) intermediate said cam surfaces and said arms to vary the flexure stress of said arms upon rotation of said cap.

6. A comparator as set forth in claim 3, wherein said flexible wall is a bellows (26′).

7. A comparator as set forth in claim 6, said spring means comprising a compression spring within said bellows and acting against one side thereof for bias to a predetermined position wherein said valves are normally open in a neutral position of a vehicle wheel and effecting continuous flow through said chambers;

said flexible member being a leaf spring in said housing and disposed to act against the other side of said bellows and in stress balance with said compression spring for said neutral wheel position.

8. A comparator as set forth in claim 1, including hydraulic flow conduits (30a, 30b) for connecting respective outlets to a tank;

and a varaible throttle valve (32a, 32b) in each said flow conduit disposed to be actuated by a respective feeler.

9. A comparator as set forth in claim 8, including a housing (13) with said pressure chambers therein;

said movable member comprising flexible wall separating said pressure chambers;

said mechanical actuating means comprises spring means effecting an initial bias in one direction of movement of said flexible wall;

and further comprising a resilient member in said housing disposed to act against said initial bias when initially stressed to hold an equlibrium position of said flexible wall and valves wherein said valves are normally open for a neutral position of said vehicle wheel.

10. A comparator as set forth in claim 1, said movable member having sides directly engageable with respective valves wherein increase of pressure in a chamber actuates said movable member to close one of said valves effective to control pressure to a hydraulic motor for steering.

* * * * *